(12) United States Patent
Soundararajan et al.

(10) Patent No.: US 8,769,202 B1
(45) Date of Patent: Jul. 1, 2014

(54) SYSTEMS AND METHODS FOR TRACKING WORKING-SET ESTIMATES WITH A LIMITED RESOURCE BUDGET

(75) Inventors: Gokul Soundararajan, Sunnyvale, CA (US); Lakshmi Narayanan Bairavasundaram, Sunnyvale, CA (US); Vipul Mathur, Bangalore (IN); Kaladhar Voruganti, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 330 days.

(21) Appl. No.: 13/198,495

(22) Filed: Aug. 4, 2011

(51) Int. Cl.
 *G06F 12/00* (2006.01)
(52) U.S. Cl.
 USPC .......................................... 711/118; 711/117
(58) Field of Classification Search
 None
 See application file for complete search history.

(56) References Cited

U.S. PATENT DOCUMENTS

| | | | | |
|---|---|---|---|---|
| 5,713,008 | A * | 1/1998 | Falkner | 711/118 |
| 5,732,240 | A * | 3/1998 | Caccavale | 711/118 |
| 2005/0071599 | A1* | 3/2005 | Modha et al. | 711/170 |
| 2008/0071987 | A1* | 3/2008 | Karn et al. | 711/118 |

OTHER PUBLICATIONS

Dominique Thiebaut et al., "Synthetic Traces for Trace-Driven Simulation of Cache Memories," IEEE Transactions on Computers, vol. 41, No. 4, Apr. 1992, pp. 388-410. Corrigendum pp. 635-636, vol. 42, No. 5, May 1993.

Kwangkeun Yi et al., "On-the-fly Circuit to Measure the Average Working Set Size," IEEE International Conference on Computer Design, Sep. 1990, pp. 471-474.

* cited by examiner

*Primary Examiner* — Matthew Bradley
*Assistant Examiner* — Daniel Tsui
(74) *Attorney, Agent, or Firm* — Perkins Coie LLP

(57) ABSTRACT

Embodiments of the systems and techniques described here can leverage several insights into the nature of workload access patterns and the working-set behavior to reduce the memory overheads. As a result, various embodiments make it feasible to maintain running estimates of a workload's cacheability in current storage systems with limited resources. For example, some embodiments provide for a method comprising estimating cacheability of a workload based on a first working-set size estimate generated from the workload over a first monitoring interval. Then, based on the cacheability of the workload, a workload cache size can be determined. A cache then can be dynamically allocated (e.g., change, possibly frequently, the cache allocation for the workload when the current allocation and the desired workload cache size differ), within a storage system for example, in accordance with the workload cache size.

35 Claims, 10 Drawing Sheets

SYSTEMS AND METHODS FOR TRACKING WORKING-SET ESTIMATES WITH A LIMITED RESOURCE BUDGET

TECHNICAL FIELD

Various embodiments generally relate to caching simulation and allocation. More specifically, some embodiments relate to systems and methods for tracking working-set estimates with a limited resource budget.

BACKGROUND

A storage server is a computer that provides storage service relating to the organization of data on writable, storage media, such as non-volatile memories and disks. A storage server may be configured to operate according to a client/server model of information delivery to enable many clients (e.g., applications) to access the data served by the system. A storage server can employ a storage architecture that serves the data with both random and streaming access patterns at either a file level, as in network attached storage (NAS) environments, or at the block level, as in a storage area network (SAN). Storage servers (e.g., monolithic, non-distributed storage servers or clustered storage servers) store data on various types of non-volatile storage media such as, for example, relatively high latency (i.e., longer access times) hard disk drive devices (HDDs) and relatively low latency (i.e., shorter access times) solid-state devices (SSDs) such as flash memory or DRAM.

HDDs generally provide good streaming performance (e.g., reading of large sequential blocks or "track reads") but do not perform well on random access (i.e., reading and writing of individual disk sectors) due to slow access times. SSDs on the other hand, are more suitable for random and frequent memory accesses because of the relatively low latency. SSD data storage devices use solid-state memory, such as non-volatile flash memory to store persistent data. With no moving parts, solid-state devices do not have mechanical delays resulting in the high latency experienced by HDDs and seek time is decreased significantly, making the SSDs very fast. SSD memory has this and other advantages over traditional disk drives. However, SSD memories are generally more expensive than HDD memories and have a shorter operational lifetime due to wear and other degradation.

Many storage servers use a combination of HDD and SSD memories. The SSD memories may be used for caching and allocated based on a requirement to meet service level objectives during peak usage. As a result, the expensive SSD memory may be over-allocated, and therefore underutilized, much of the time. As such, there are a number of challenges and inefficiencies found in traditional storage servers.

SUMMARY

Various embodiments generally relate to systems and methods for tracking working-set size estimates with a limited resource budget. A working-set size of a workload, from the classical definition, is the amount of unique data touched in an interval. For example, one million blocks accessed in an interval where ten million IO accesses were issued to the storage server. Some embodiments provide for a method comprising estimating cacheability of a workload. The cacheability of a workload describes the data, or the amount of data, that is suitable for being stored in a cache. Estimating the cacheability of the workload can be based on a first working-set size estimate generated from the workload over a first monitoring interval. Then, based on the cacheability of the workload, a workload cache size can be determined. A cache then can be dynamically allocated (e.g., change, possibly frequently, the cache allocation for the workload when the current allocation and the desired workload cache size differ), within a storage system for example, in accordance with the workload cache size.

Embodiments of the present invention also include other methods, systems with various components, and computer-readable storage media containing sets of instructions to cause one or more processors to perform the methods, variations of the methods, and other operations described herein. While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
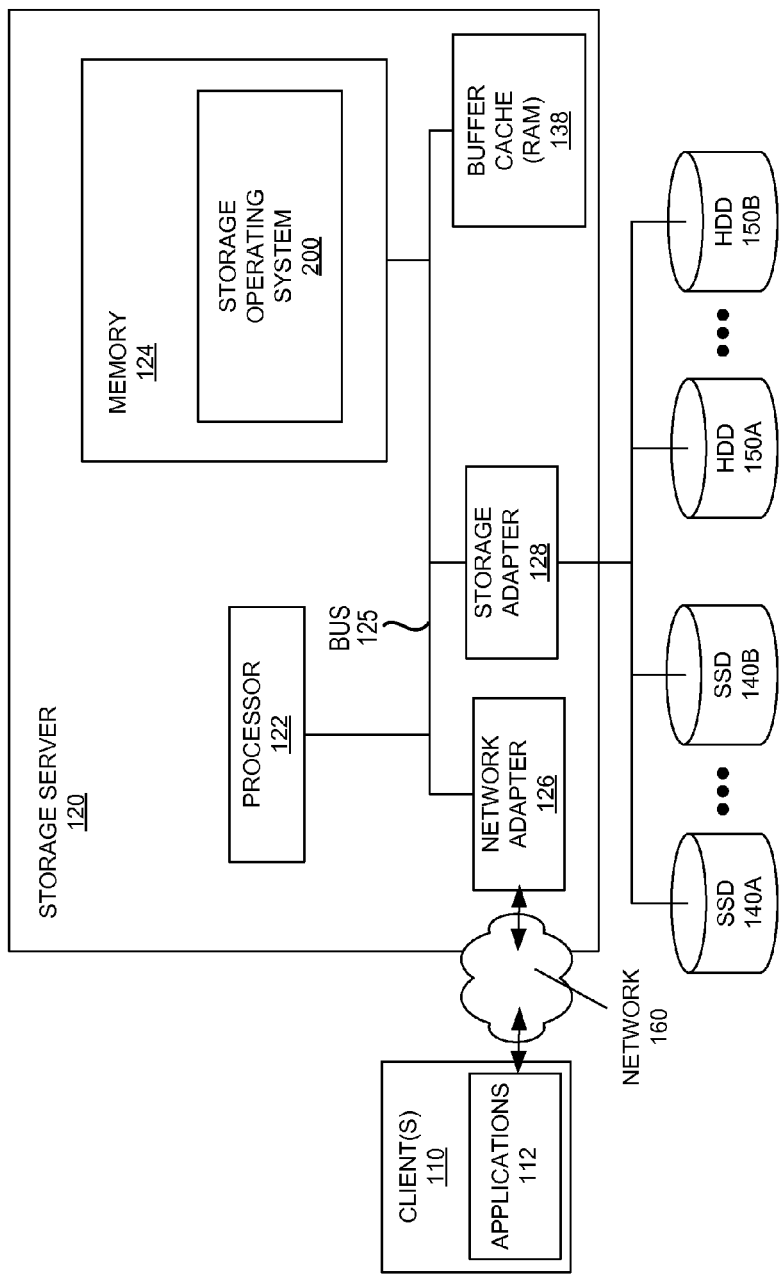
FIG. 1 shows a block diagram of a storage system in which some embodiments may be implemented or utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments generally relate to caching simulation and allocation. More specifically, some embodiments relate to systems and methods for tracking working-set estimates with a limited resource budget.

As the speed discrepancy between storage media (hard disk drives) and memory (Flash, DRAM) grows, caches have a larger impact in determining the performance of a storage system. Caching is a design technique that provides the benefit of vast amounts of memory in a more economical manner by exploiting the property of locality that states that applications tend to re-use data that they have recently used. This is seen in two forms: temporal locality and spatial locality. Temporal locality states that data used now will be reused in the immediate future. Spatial locality states that if a piece of data is accessed now then, its neighbors will be accessed in the near future. Examples of caching techniques include keeping the most-recently used data (or most-frequently used data) in a small storage media (e.g., RAM) such that the latency of data access is minimized.

To determine if caching will benefit a workload requires a determination of the workload's cacheability. However, current storage systems do not make or maintain estimates of a storage workload's cacheability for two primary reasons. First, accurately determining the cache benefit involves analysis of a large number of input/output (IO) accesses. Second, maintaining the estimates within the storage server tends to be prohibitively expensive given memory constraints of the storage server. Various embodiments leverage several insights into the nature of workload access patterns and the working-set behavior to reduce the memory overheads, thereby making it feasible to maintain running estimates of a workload's cacheability in current storage systems. Examples of the features and advantages found in various embodiments include, but are not limited to, the following:

1. The ability to monitor a workload's cacheability within resource constrained storage servers;
2. Ability to dynamically determine the monitoring interval (N) such that enough IO accesses are monitored to make an accurate cacheability estimate, but not all IO accesses. This helps in reducing memory demands as well keeping the estimates "fresh;"
3. The use of several properties of working-set estimates to determine which, and how many estimates to keep in memory; and
4. Utilize more optimal estimation methods by leveraging the duplicity inherent in the storage server environment.

These features and advantages, along with others, found in various embodiments make tracking the workload's cacheability feasible even in the most resource constrained environments.

The techniques introduced here can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

In this description, the phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily all refer to the same embodiments.

FIG. 1 shows a block diagram of an exemplary storage system 100 in which some embodiments may be utilized. In the embodiments shown in FIG. 1, storage system 100 includes a storage server 120 having one or more processors 122, a memory 124, a network adapter 126, a storage adapter 128 and buffer cache 138 interconnected by a system bus 125. The storage server 120 can be a computer that provides storage services relating to the organization of information on writable, persistent storage media, such as SSDs and HDDs. The storage server 120 also includes a storage operating system 200 that implements a file system to logically organize the stored data as a hierarchical structure of logical data containers (e.g., volumes, logical units, directories and/or files) on the electronic storage media 140 and magnetic storage media 150.

It will be understood by those skilled in the art that this description may apply to any type of special-purpose computer (e.g., file server or storage serving appliance) or general-purpose computer embodied as, or having a storage server including a standalone computer or portion thereof. While FIG. 1 illustrates a monolithic, non-distributed storage server 120, various embodiments are applicable to other types of storage configurations (e.g., cluster storage configurations). Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements, including a storage server that provides file-based access to data, block-based access to data, or both.

Memory 124 includes storage locations that are addressable by the processor(s) 122 and adapters and can store software programs and data structures to carry out the techniques described herein. Processor(s) 122 and adapters may, in turn, include processing elements and/or logic circuitry configured to execute the software programs and manipulate the data structures. The storage operating system 200, portions of which is typically resident in memory 124 and executed by the processor(s) 122, functionally organizes the storage server by invoking storage operations in support of software processes executing on the server 120. It will be apparent to those skilled in the art that other memory mechanisms, such as various computer-readable media, may instead be used to store and execute program instructions pertaining to the embodiments described herein. The electronic storage media 140 and magnetic storage media 150 are configured to provide a persistent, writable storage space capable of maintaining data in the event of a power loss or other failure of the storage server 120. Accordingly, the electronic storage media 140 and magnetic storage media 150 may be embodied as large-volume memory arrays.

The network adapter 126 includes the circuitry and mechanical components needed to connect the storage server 120 to a client 110 over a computer network 160, which may include a point-to-point (P2P) connection or a shared medium. Network 160 can be any group of interconnected devices capable of exchanging information. In some embodiments, network 160 may be as few as several personal computers, special purpose computers, and/or general purposed computers on a Local Area Network (LAN) or as large as the Internet. In some cases, network 160 may be comprised of multiple networks (private and/or public), even multiple heterogeneous networks, such as one or more border networks, broadband networks, service provider networks, Internet Service Provider (ISP) networks, and/or Public Switched Telephone Networks (PSTNs), interconnected via gateways operable to facilitate communications between and among the various networks.

Client 110 may be a general-purpose computer configured to execute applications 112, such as a database application. Moreover, the client 110 may interact with the storage server 120 in accordance with a client/server model of information delivery. That is, the client(s) 110 may request the services of the storage server 120 and the system may return the results of the services requested by the client 110, such as by exchanging packets over the network 160. The client(s) 110 may issue packets including file-based access protocols such as the Common Internet File System (CIFS) protocol or Network File System (NFS) protocol over TCP/IP when accessing information in the form of files. Alternatively, the client(s) 110 may issue packets including block-based access protocols such as the Small Computer Systems Interface (SCSI) protocol encapsulated over TCP (iSCSI) and SCSI encapsulated over Fibre Channel Protocol (FCP) when accessing information in the form of LUNs or blocks.

The storage adapter 128 cooperates with the storage operating system 200 executing on the storage server 120 to access information requested by the client 110. The information may be stored on the electronic storage media 140 and magnetic storage media 150, which are illustratively embodied as SSDs and HDDs. The storage adapter includes input/output (IO) interface circuitry that couples to the SSD 140 and HDD 150 over an IO interconnect arrangement, such as a conventional high-performance Fibre Channel serial link topology. The information is retrieved by the storage adapter 128 and, if necessary, processed by the processor(s) 122 (or the adapter 128) prior to being forwarded over the system bus 125 to the network adapter 126 where the information is formatted into a packet and returned to the client 110.

In the illustrated embodiments, buffer cache 138 is coupled with the memory 124 over the system bus 125. However, this is by way of example and not of limitation as the buffer cache 138 may be coupled with the memory using, for example, a point-to-point connection. In addition, the buffer cache 138 may be separate from the memory 124 (as illustrated), part of the memory 124, or part of the processor(s) 122. Generally, a buffer cache memory, such as buffer cache 138, includes a smaller, lower-latency (faster) memory such as RAM (e.g., DRAM), operable to reduce the average time to perform a memory access. The buffer cache typically stores copies of the data from the most frequently used locations in memory 124 so that when a memory access is performed, the buffer cache may first be checked to determine if required data is located therein, and, if so, the data may be accessed from the buffer cache 138 instead of the persistent storage media, such as SSDs or HDDs. In this manner, a buffer cache, such as buffer cache 138, reduces memory access times by avoiding having to access persistent storage to obtain the data.

Figure 2:
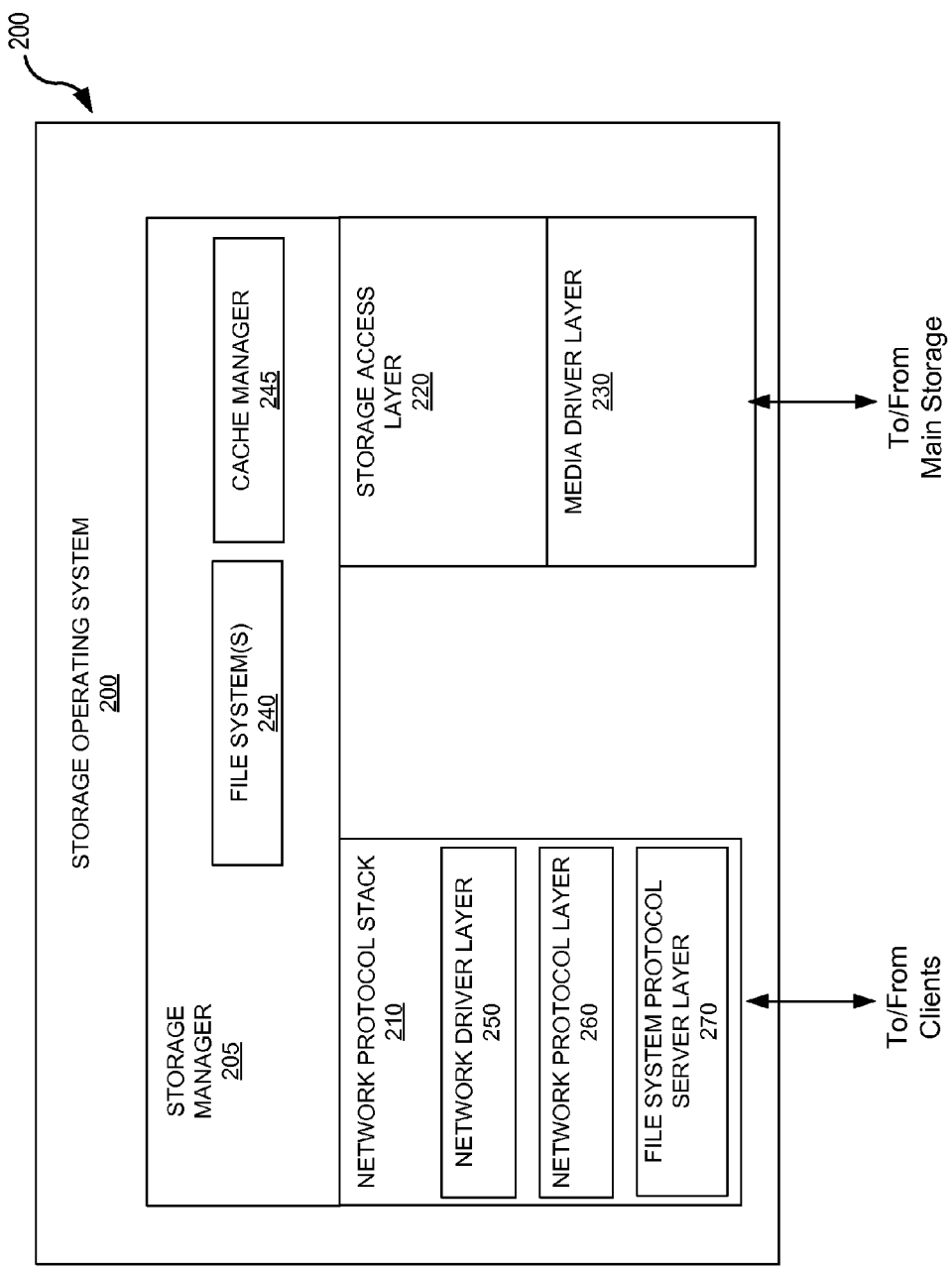
FIG. 2 shows a block diagram of a storage operating system.

FIG. 2 shows an example of the storage operating system 200. As used herein, the term "storage operating system" generally refers to the computer-executable code operable on a computer to perform a storage function that manages data access. The storage operating system can also be implemented as a microkernel, an application program operating over a general-purpose operating system such as UNIX® or Windows NT®, or as a general-purpose operating system configured for the storage applications as described herein. In the illustrated embodiments, the storage operating system includes a network protocol stack 210 having a series of software layers including a network driver layer 250 (e.g., an Ethernet driver), a network protocol layer 260 (e.g., an Internet Protocol layer and its supporting transport mechanisms: the TCP layer and the User Datagram Protocol layer), and a file system protocol server layer 270 (e.g., a CIFS server, a NFS server, etc.).

In addition, the storage operating system 200 includes a storage access layer 220 that implements a storage media protocol such as a Redundant Array of Independent Disks (RAID) protocol, and a media driver layer 230 that implements a storage media access protocol such as, for example, a Small Computer Systems Interface (SCSI) protocol. Any and all of the modules of FIG. 2 can be implemented as a separate hardware component. For example, the storage access layer 220 may alternatively be implemented as a parity protection RAID module and embodied as a separate hardware component such as a RAID controller.

Bridging the storage media software layers with the network and file system protocol layers is a storage manager 205 that implements one or more file system(s) 240. In one embodiment, the storage manager 205 implements data layout algorithms that improve read and write performance to the electronic storage media 140 and magnetic storage media 150. For example, storage manager 205 can be configured to perform initial placement and relocation of the data among multiple tiers of heterogeneous storage media of a hybrid storage aggregate and to allow clients to access any subsystems configured to perform the storage functions described herein.

Cache manager 245, in accordance with various embodiments, maintains a workload's cache profile by estimating the workload's cacheability using a limited amount of resources on the storage server 120. For a given workload that is running on a storage server, cache manager 245 can make a determination as to how many IO accesses need to be processed (denoted as parameter N), and how many estimates need to be kept (denoted as parameter E) to make an accurate working-set estimate curve. To achieve this, cache manager 245 can use information about the characteristics of the working-set estimate curve, the workload's properties, and the estimation methodology.

Figure 3:
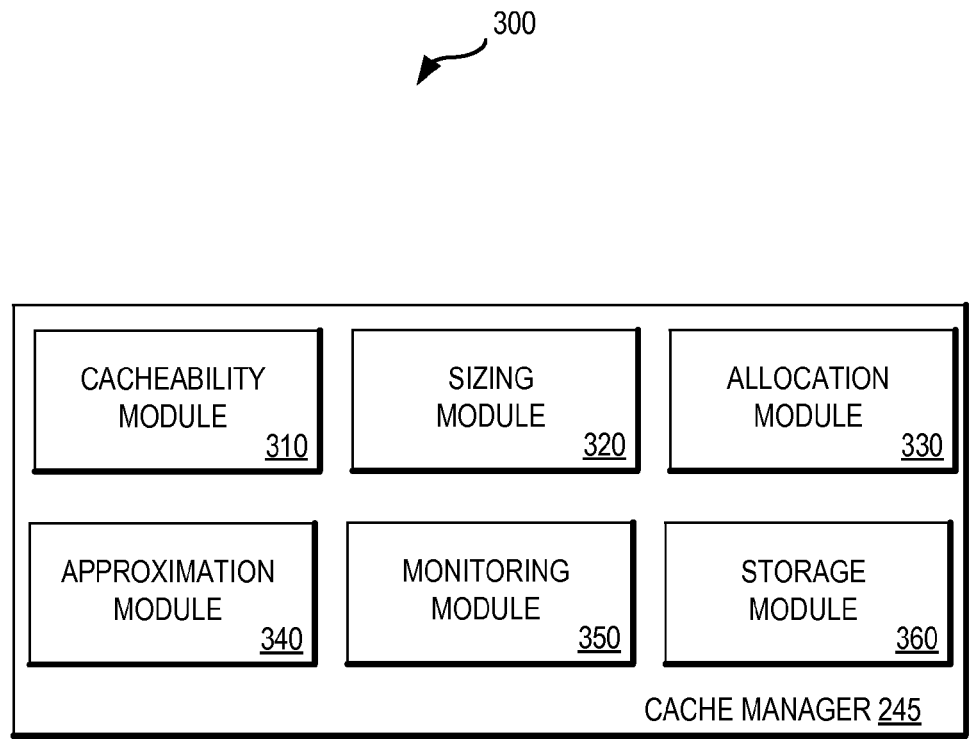
FIG. 3 is a block diagram of components of a cache manager.

FIG. 3 is a block diagram of an example of a cache manager 300. According to the embodiments shown in FIG. 3, cache manager 300 can include cacheability module 310, sizing module 320, allocation module 330, approximation module 340, monitoring module 350, and storage module 360. Each of these modules can be embodied as special-purpose hardware (e.g., one or more ASICS, PLDs, FPGAs or the like), or as programmable circuitry (e.g., one or more microprocessors, microcontrollers or the like) appropriately programmed with software and/or firmware, or as a combination of special-purpose and programmable circuitry. Other embodiments may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, cacheability module 310 and sizing module 320 can be combined into a single module.

Memory 124 may be used to store instructions for operating one or more applications or modules on processor(s) 122. For example, memory 124 could be used in one or more embodiments to house all or some of the instructions needed to execute the functionality of cacheability module 310, sizing module 320, allocation module 330, approximation module 340, monitoring module 350, and storage module 360.

Cacheability module 310 can be configured to estimate the cacheability of a workload. According to some embodiments, the cacheability estimate can be based on a working-set size estimate generated from the workload over a monitoring interval. The working-set size of a workload, from the classical definition, is the amount of unique data touched in an interval. In accordance with various embodiments, the working-set size can be reported in multiple ways. As one example, the working-set size can be reported as the number of unique blocks accessed per a time interval, measured as the number of IO operations. An example of the working-set size can be one million blocks accessed in a time period where ten million IO accesses were issued to the storage server.

One method for computing the working-set size is to maintain a table, or other data structure, of unique blocks accessed in a given time interval, and report the number of items in the table, or other data structure, at the end of the monitoring period. For example, assuming cacheability module 310 is configured to measure the working-set size over a time interval of five IO accesses, and during the five IO access the following sequence of IO accesses is recorded: {A,B,C,A,B}. At the end of the monitoring interval, three unique blocks were accessed, namely {A,B,C}, and the working-set size could be reported as three blocks in five IO accesses.

Various embodiments use the set of working-set size estimates to find the cacheability of a workload. One method used in various embodiments uses the formula $$u(n) = An^{1/\theta}$$

to characterize the set of working-set size estimates as the outcome of hyperbolic random walks. With this approach, the working-set size estimates follow a curve where u(n) is the number of unique blocks, n is the number of IO accesses seen, θ is a locality parameter, and A is a rate. Parameters A and θ can be used to fit the data (e.g., using optimization techniques to minimize error). Then, given this curve, for a cache using the least-recently used (LRU) replacement policy, the cacheability can be computed as $$MR = \left(\frac{dn}{du}\right)^{-1} = \frac{A^\theta}{\theta} u^{(1-\theta)}$$

where MR is the miss-ratio of the workload for a cache containing u blocks.

Sizing module 320 can determine a workload cache size based on the cacheability of the workload. In various embodiments, the workload cache size may be initially set based on the working-set size estimates. In other cases, the cache size may be initially set to minimize the miss-ratio or achieve a desired miss-ratio. The workload cache size may be adjusted to ensure the size is between a maximum workload cache size and a minimum workload cache size. In some cases, the workload cache size may be adjusted based on one or more other factors such as allocation costs and service level objectives. For example, if the allocation of the workload cache size would negatively impact a service level objective of another workload with a higher priority, then the workload cache size may be reduced. Using the workload cache size, allocation module 330 dynamically allocates (e.g., change, possibly frequently, the cache allocation for the workload when the current allocation and the desired workload cache size differ), the cache memory associated with the workload.

Approximation module 340 receives the working-set size estimate and an actual working-set size over the monitoring interval and generates an indication of approximation by determining how well the working-set estimate tracks the actual working-set size over the monitoring interval. In some embodiments, the indication of approximation can be computed by standard statistical techniques such as root mean square error which can be computed as the sum of the differences between values predicted by the model and the values actually observed. In some cases, other properties such as volume size, maximum cache size, and/or the slope of the curve can also be used in computing the indication of approximation.

Monitoring module 350 can be configured to receive the indication of approximation generated by approximation module 340 and set the monitoring interval to be used in future cacheability estimations. For example, the monitoring interval for use in a subsequent cacheability estimation can be set to stay the same when the indication of approximation identifies the working-set size estimate tracks the working-set size of the workload within a predetermined criteria. The monitoring interval for use in a subsequent cacheability estimation can be increased when the indication of approximation identifies the working-set size estimate fails to tracks the working-set size of the workload within the predetermined criteria. In other cases, such as a change in the qualitative behavior of the workload, the monitoring interval can be decreased.

In some embodiments, monitoring module 350 can monitor the workload for changes in one or more qualitative features of the workload. Upon detection of changes in the one or more qualitative features of the workload, the monitoring module can adjust the monitoring interval (e.g., by increasing or decreasing the number of IO accesses). For example, monitoring module 350 can increase the monitoring interval until either the working-set size estimate reaches a size of the cache memory or the indication of approximation identifies that the working-set size estimate tracks the working-set size of the workload within the predetermined criteria. In accordance with one or more embodiments, not all the data regarding the working-set size is stored.

Some embodiments use storage module 360 to determine whether, and/or where, the working-set size estimate should be stored. In some embodiments, for example, storage module 360 can use a curve-fitting approach that utilizes the working-set size estimates from different time periods. To minimize the estimates kept, storage module 360 can choose to store estimates only if the size of the working-set size changed significantly. In some cases, the history of the workload estimates from previous iterations can be used to build the curve. For example, building the curve in a previous period of N IO accesses, one can determine to keep only one out of every two estimates. Still yet, storage module 360 can leverage the information from other similar workloads. For example, there can be cases where different workloads run similar software (e.g., OLTP databases), hence, the working-set size estimates would be expected to be similar.

Figure 4:
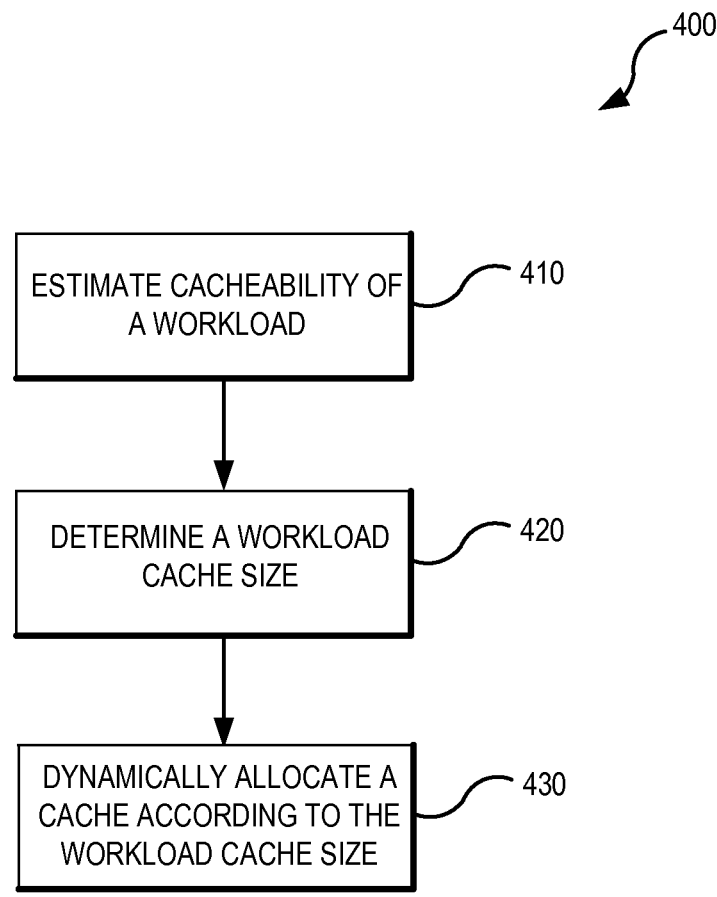
FIG. 4 is a flow chart illustrating a process for dynamically allocating a cache.

FIG. 4 is a flow chart illustrating an example of a process 400 for dynamically allocating a cache in accordance with the technique introduced here. During estimation operation 410, the cacheability of a workload is estimated. This can be done, for example, as described above with reference to cacheability module 310. Once the cacheability of the workload has been estimated, determination operation 420 determines a workload cache size based, at least in part, on the cacheability of the workload. In some embodiments, other factors such as a maximum allocation, service level objectives, priority ranking of other workloads, and other factors may be part of determination operation 420. Once the workload cache size has been determined, allocation operation 430 dynamically allocates a cache within the storage system according to the workload cache size determined by determination operation 420. In accordance with various embodiments, allocation operation 430 can occur at period intervals, in real-time, on demand, and/or on a predetermined schedule.

Figure 5:
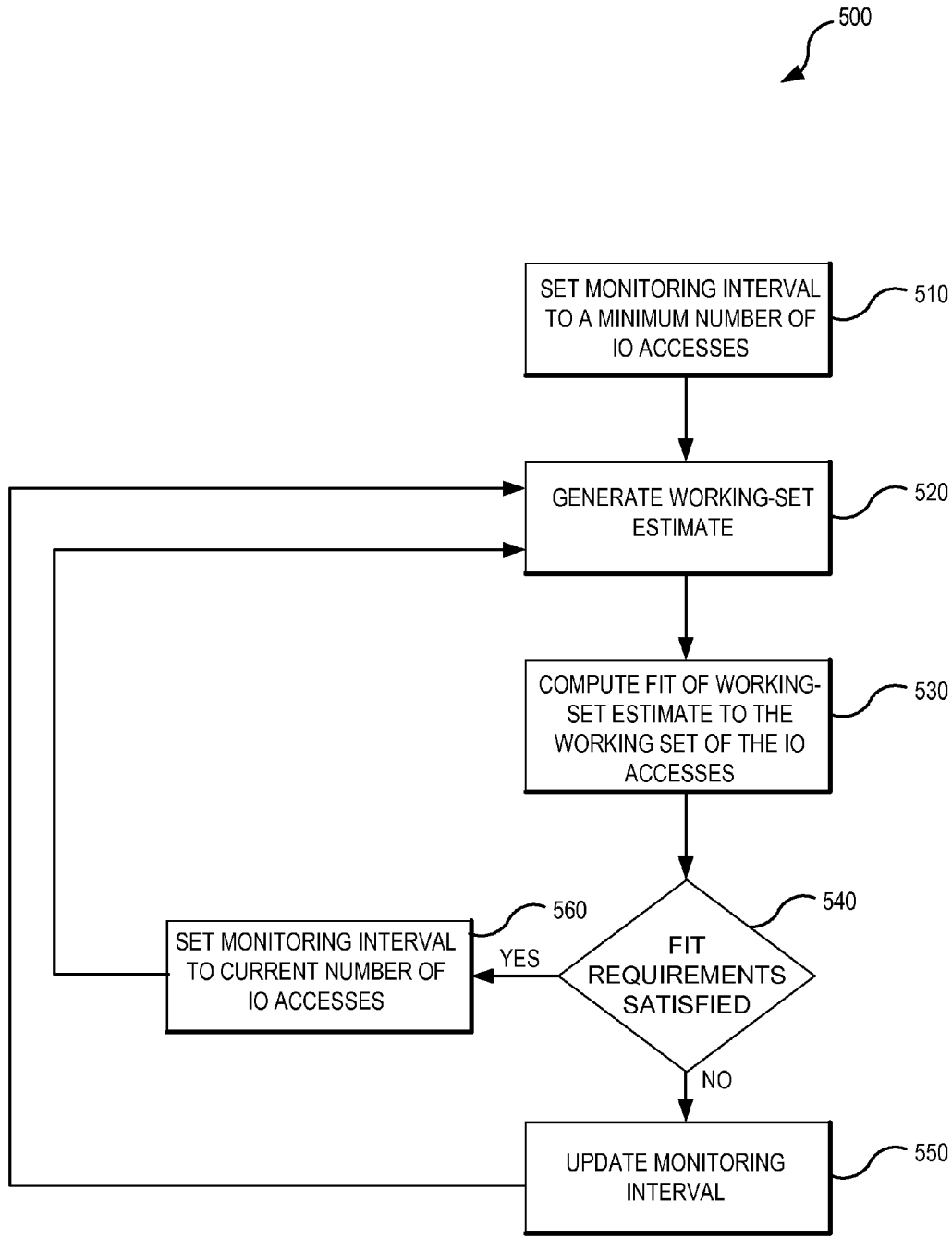
FIG. 5 is a flow chart illustrating a process for adjusting a monitoring interval.

FIG. 5 is a flow chart illustrating an example of a process 500 for adjusting a monitoring interval. As illustrated in FIG. 5, setting operation 510 sets an initial monitoring interval/period (N) to a minimum number of IO access (e.g., 1000 IO accesses). The minimum number of IO access can be determined based on a variety of factors, such as, but not limited to, the nature of the workload, historical workload reports, similar workloads, and others.

Once the initial monitoring interval is set, generation operation 520 generates a working-set estimate for the workload based on observations made during the initial monitoring interval. Fitness operation 530 receives the working-set estimate and computes a fit of the working-set estimate to the working set of the IO access. The fit can be computed, for example, by standard statistical techniques such as $R^2$, plus use the other properties such as volume size, maximum cache size, and/or the slope of the curve.

Decision operation 540 determines if the fit requirements have been satisfied. If the fit requirements have not been satisfied, decision operation 540 branches to adjustment operation 550 where the monitoring interval is updated (e.g., by increasing the number of IO access in the monitoring interval) which then generates an updated working set estimate based on the updated monitoring interval at generation operation 520. If decision operation 540 determines that the fit requirements have been satisfied, decision operation 540 branches to setting operation 560 where the monitoring interval is set to the current number of IO accesses which is used by generation operation 520 in subsequent generations of working-set estimates.

Figure 6:
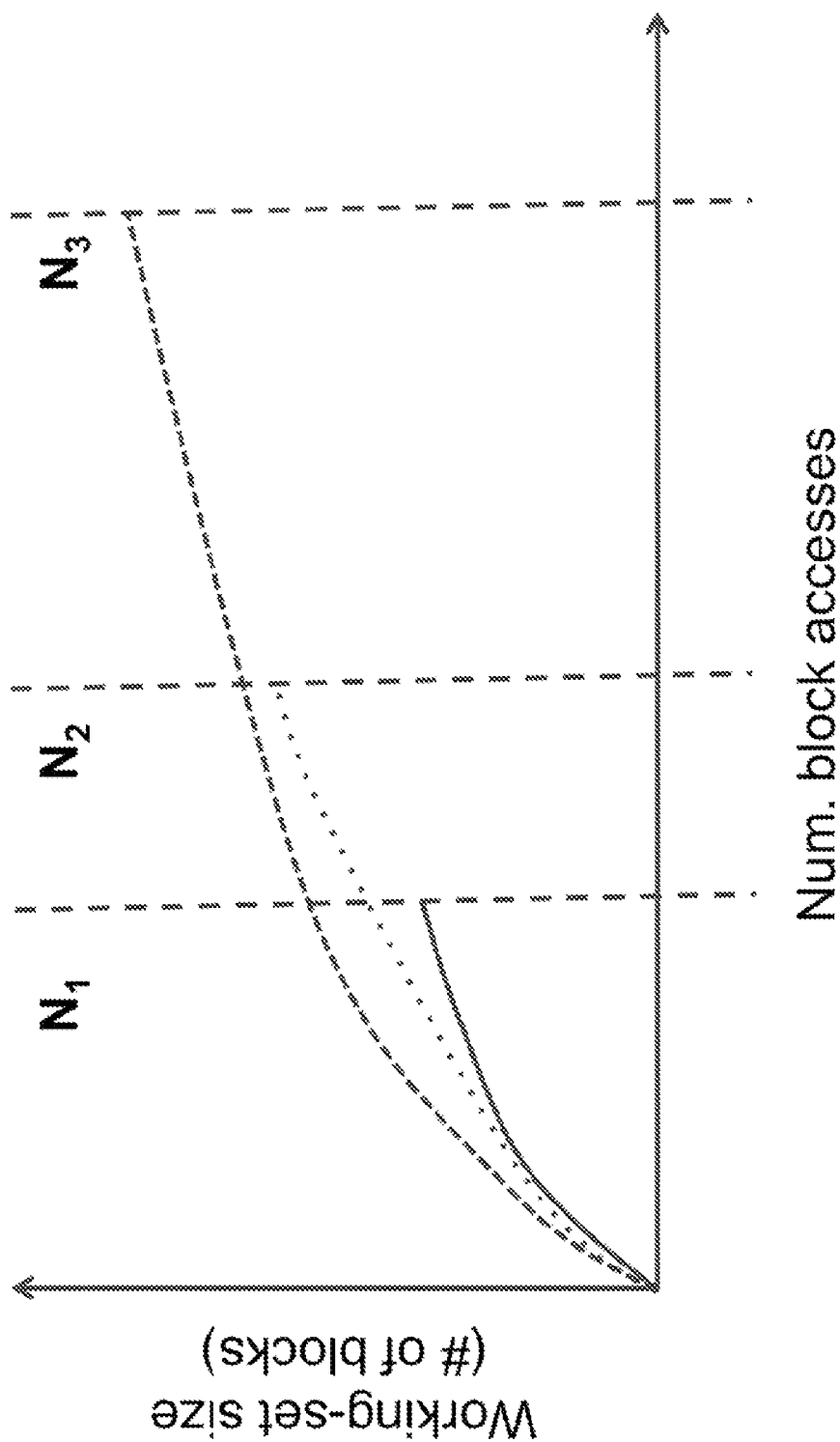
FIG. 6 is a graph of a working set size and estimate over multiple intervals.

FIG. 6 is a graph 600 of a working-set estimate over multiple intervals, $N_1$, $N_2$, and $N_3$. The longer the monitoring period (to capture more data) the more accurate the cacheability can be estimated. However, various embodiments try to generate accurate estimates with a smaller monitoring period in order to reduce the memory consumption.

To determine a minimum monitoring interval, some embodiments can consider the size of the workload's volume, the size of the cache available to the workload, and the shape of the working-set size estimate curve. For example, the size of the volume can be a good indicator to determine N as the workload cannot access data beyond its volume. Similarly, if a workload cannot be assigned a cache larger than C blocks, and the working-set estimate has reached that limit—that is, $u(n)=C$, then monitoring can be stopped, as a larger cache cannot be assigned. In addition, the shape of the curve (e.g., the slope of the line in FIG. 6) can be used to determine if the workload has saturated. For example, if the slope of the line with increasing IO accesses is zero, then it indicates that the workload has accessed all data needed. Hence, additional longer monitoring periods would be neither beneficial nor necessary.

Figure 7:
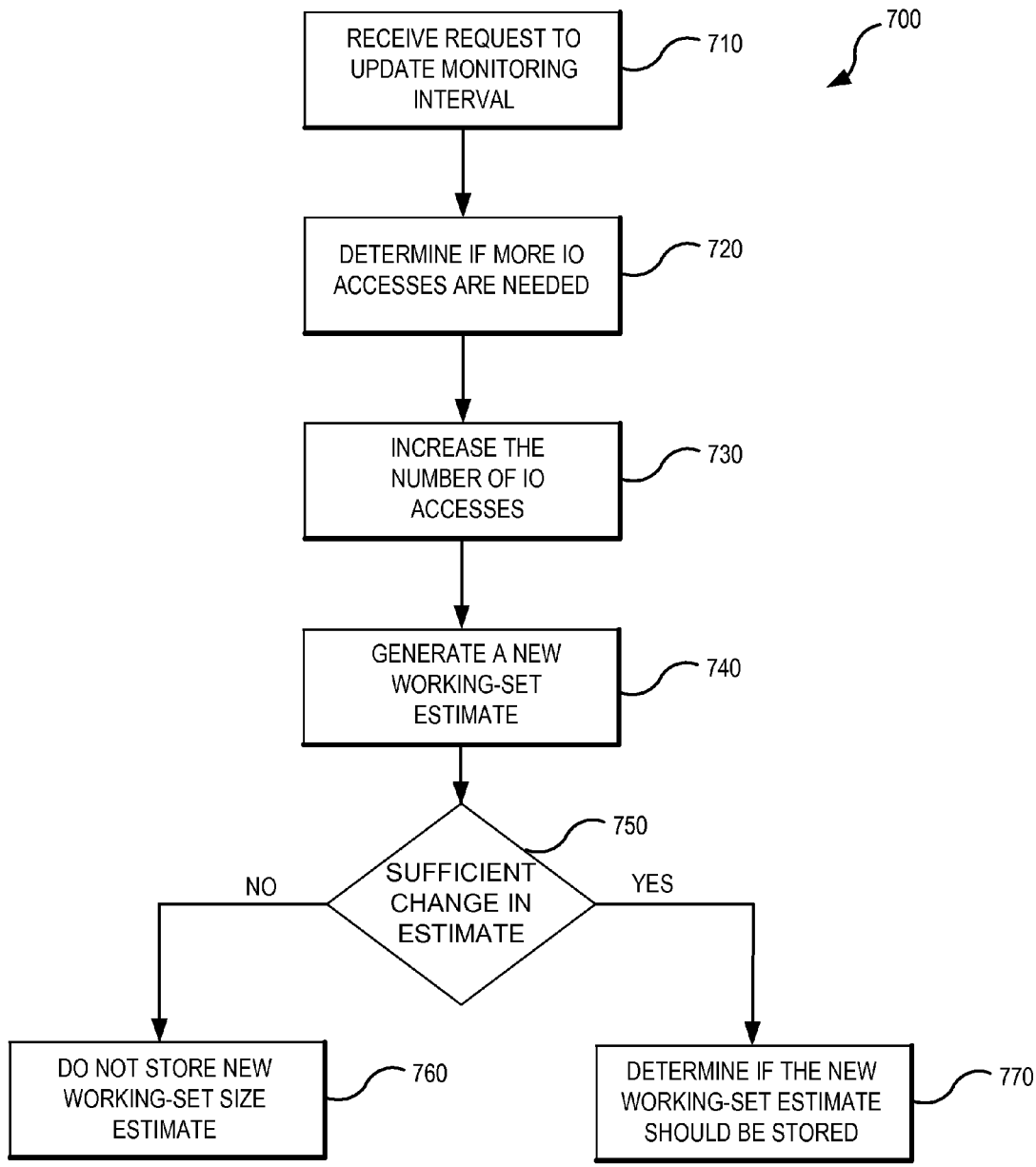
FIG. 7 is a flow chart illustrating a process for determining which data should be stored.

FIG. 7 is a flow chart illustrating a process 700 for determining which data should be stored. As illustrated in FIG. 7, requesting operation 710 receives a request to update a monitoring interval. Adjustment operation 720 determines how many more IO access need to be monitored. As discussed above, a number of factors (e.g., maximum cache size, workload priority level, service level objectives of this and/or other workloads, qualitative changes in the workload, and/or other factors) may be considered by various embodiments to determine the new monitoring interval. The number of IO access can be increased by the determined amount during setting operation 730. While not illustrated in FIG. 7, in some embodiments, setting operation 730 may even decrease the number of IO accesses to be recorded in future monitoring intervals.

Generation operation 740 generates an updated working-set estimate based on the increased number of IO access monitored. The updated working-set estimate can be completely recomputed in some cases or based on data collected during previous monitoring intervals. Either way, comparison operation 750 compares the updated working-set estimate to a previous working set estimate. If comparison operation 750 determines that a sufficient change in the estimate has not occurred, the new working-set size estimate is not stored.

However, if comparison operation 750 determines that a sufficient change in the estimate has occurred, comparison operation branches to storage operation 770 where an additional determination is made as to whether the new working-set estimate should be stored. In accordance with various embodiments, the determination as to which new working-set estimates should be saved can be based on a value change in the working-set size, a history of the workload's estimates, and/or information from similar workloads.

As discussed above, the initial monitoring interval N can be set to a predetermined amount M (i.e., N=M) since at least a minimum amount of IO access monitoring (i.e., trace) would be needed to generate an estimate of the workload's cacheability. Let E denote the number of estimates kept in memory, which can be initially set to zero (i.e., E=0) in some embodiments. After M accesses, the working-set estimate curve can be computed and a fitness approximation score (i.e., a goodness of fit) can be computed. The fitness approximation score can be computed, for example, using standard statistical techniques such as $R^2$, plus the possible use other properties such as, but not limited to: (1) volume size, (2) maximum cache size, and (3) the slope of the curve.

If the curve satisfies the requirements for a satisfactory approximation, the monitoring interval N can be recorded for use in subsequent cacheability estimations as a good working-set size curve has been generated. If however, the curve fails to satisfactory the requirements for a satisfactory approximation, and more trace (i.e., a larger monitoring interval) may be needed to adequately predict the working-set size and hence the cacheability of the workload. Typically, the curve will fail to satisfactorily satisfy the approximation requirements for at least one of two reasons: (A) not enough data has been recorded and the number of IO accesses can be increased, or (B) the workload has changed so the previous data points cannot be used in creating future estimates.

Figure 8:
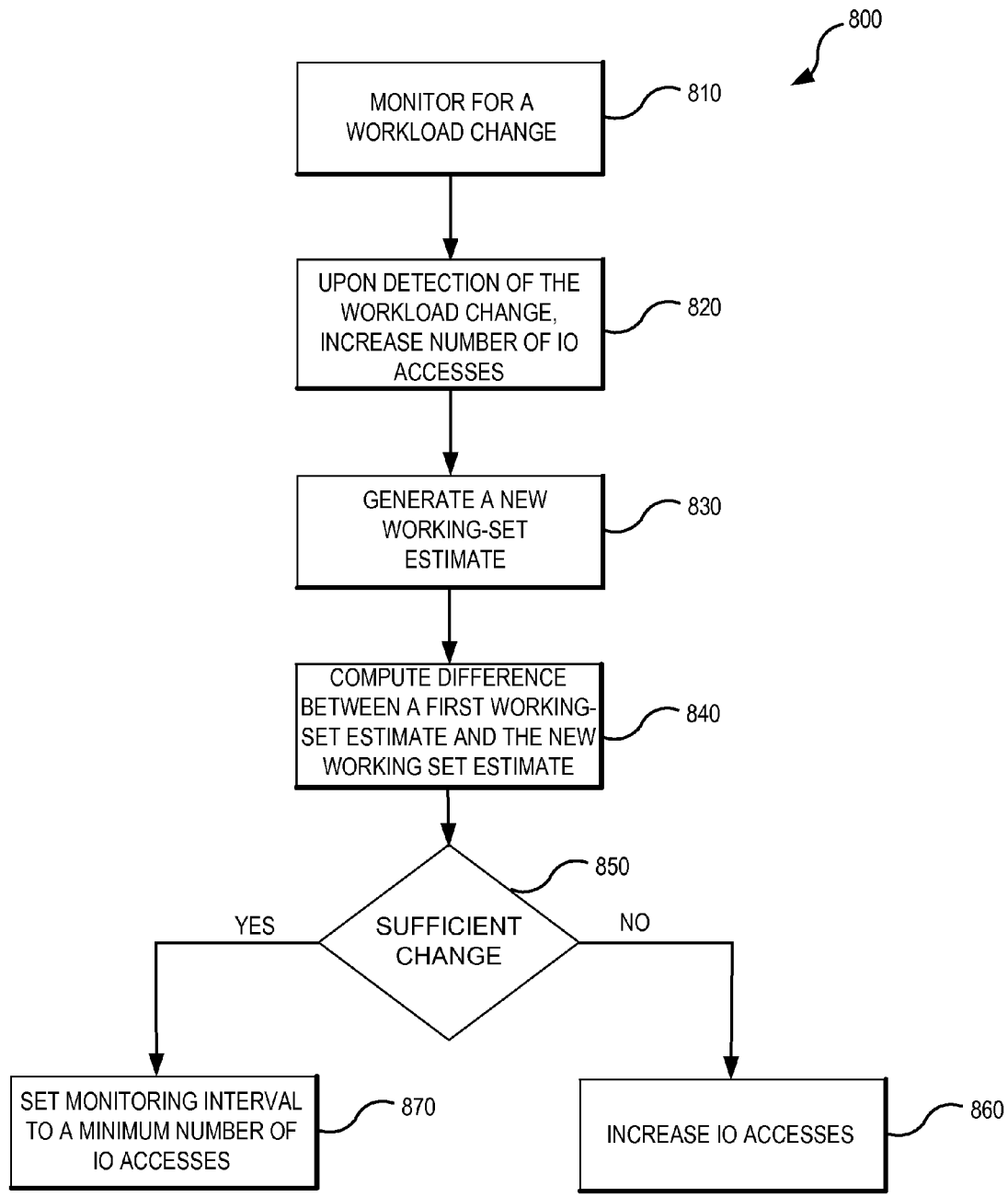
FIG. 8 is a flow chart illustrating a process for determining the monitoring interval.

FIG. 8 is a flow chart illustrating a process 800 for determining the monitoring interval. Monitoring operation 810 monitors for a change in the workload. In some embodiments, monitoring operation checks for a change after every M accesses as this creates an estimate for the same number of IO access. In other embodiments, monitoring operation 810 may check for a change on a different schedule or even on demand from a user. Upon detection of a change in the workload, a decision can be made to increase the number of IO access (e.g., setting N=N+M) in processing operation 820. Once the number of IO accesses have been increased, generation operation 830 generates a new working-set estimate for the new monitoring interval.

Comparison operation 840 can compare the current working-set size to the previous working-set size over the previous monitoring interval. Determination operation 850 determines if the two estimates vary sufficiently (e.g. greater than ε). If the change in working-set size is less than a predetermined amount (e.g., less than δ) then, a decision is made not to store the latest estimate and the number of IO accesses can be increased in adjustment operation 860. However, if a change is sufficient to justify storing the latest estimate, the number of estimates can be increased (e.g., by one) while tracing operation 870 sets the monitoring interval to a smaller amount (e.g., the minimum). In some embodiments, previous estimates can be pruned by running a background pruning algorithm. In some cases, determination operation 850 can use other metrics and workload stats (e.g., read/write ratio) in determining if the two estimates vary sufficiently.

Figure 9:
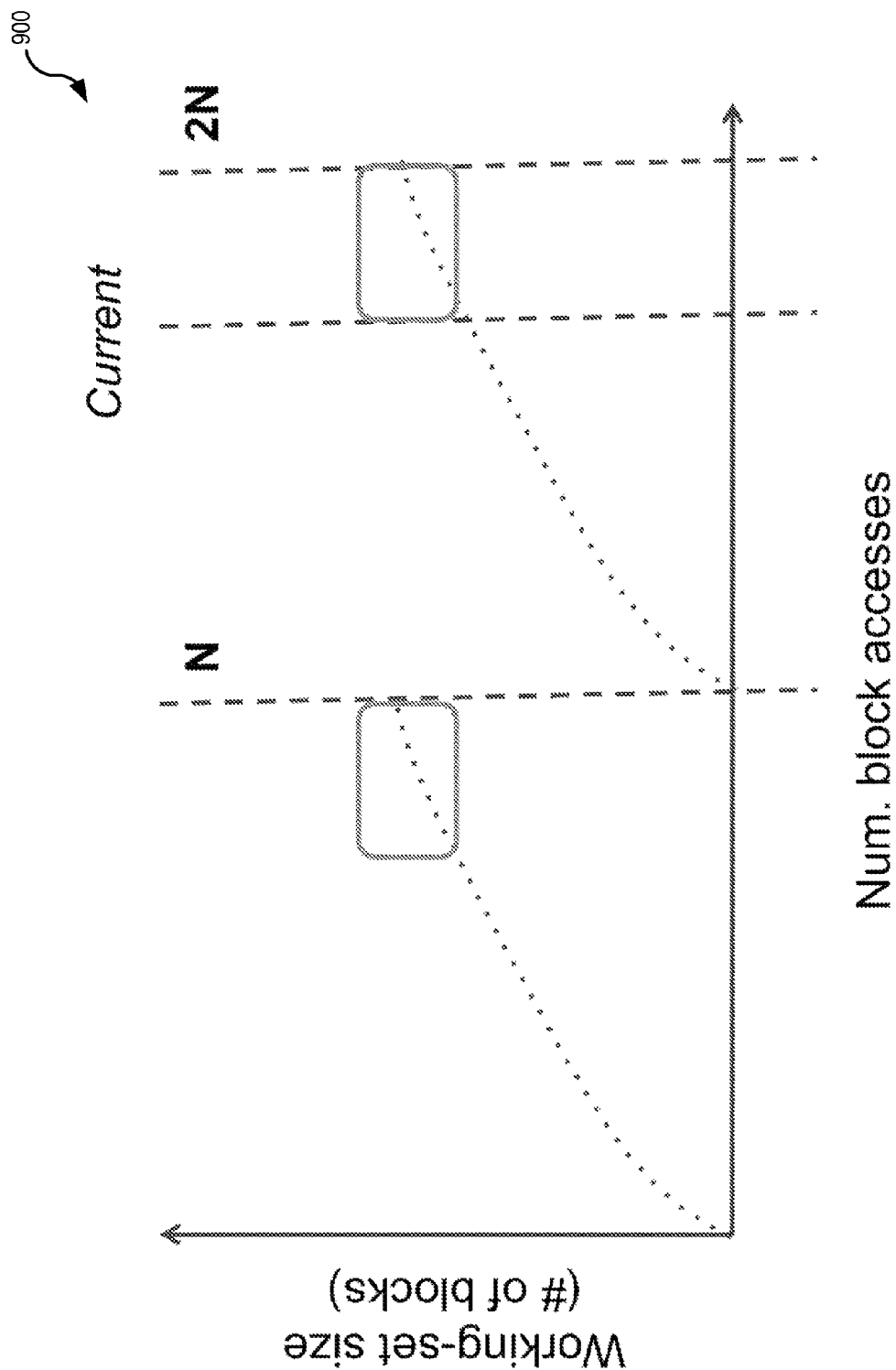
FIG. 9 is a graph illustrating how portions of a previous working-set size of a workload can be used in the prediction of the current working-set size.

Various embodiments balance accuracy and freshness of data by utilizing the fact that the working-set size estimates are continuously monitored. FIG. 9 is a graph 900 illustrating how portions of a previous working-set size of a workload can be used in the prediction of the current working-set size. As illustrated in FIG. 9, an interval of N IO accesses was monitored and the working-set size estimate was fitted with a workload. At a new moment in time (denoted as "current"), the user requests a new set of working-set size estimates. However, at this time, sufficient estimates are not available to build an accurate curve, therefore giving two options: (1) report the working-set size curve that was computed earlier, or (2) report a new curve (albeit with fewer estimates) using the new estimates.

Figure 10:
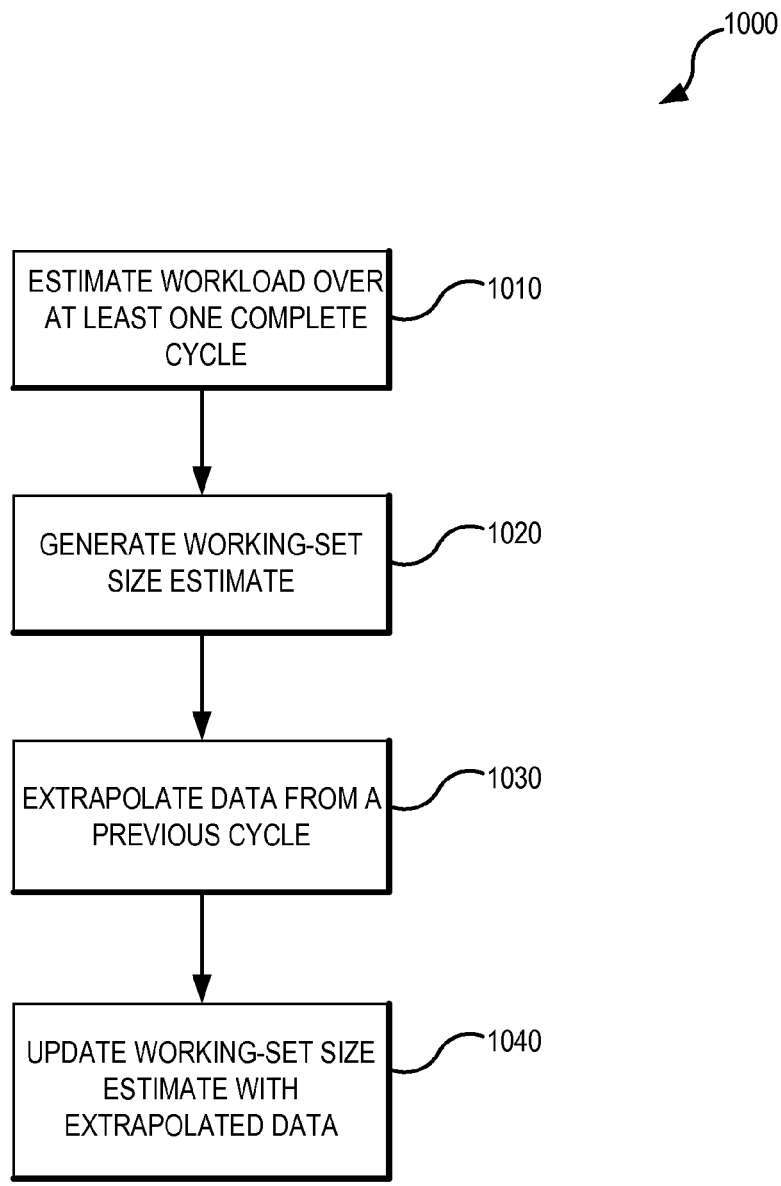
FIG. 10 is a flow chart illustrating a process for updating a working-set size estimate with extrapolated data.

By leveraging the similarity between the curves generated in two time periods, various embodiments can generate an improved estimation. FIG. 10 is a flow chart illustrating a process 1000 for updating a working-set size estimate with extrapolated data.

In the embodiments illustrated in FIG. 10, estimation operation 1010 estimates a workload over at least one complete cycle. Then generation operation 1020 generates a working-set size estimate over the monitoring interval. Data from a previous monitoring cycle (or estimated data generated from the approximation) can be used in extrapolation operation 1030 to complete an estimate of the remaining monitoring cycle. For example, by determining that workload has remained stable (by evaluating the similarity between the two curves), the estimates for the remaining monitoring interval can be gathered in the previous monitoring period can be substituted to improve the accuracy of the newer estimate curve. In some cases, given that the estimate curve has been computed every N IO accesses, the curve can be compared across two intervals. Specifically, if the estimates for the same sub-interval are compared, a determination can be made as to whether the workload has changed dramatically (indicated by a large change in the working-set estimate), and if needed, restart the estimation process. Based on the extrapolated data, estimation operation 1040 generates an updated working-set size estimate based on the extrapolated data.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method for caching allocation performed on a storage system, the method comprising:
    estimating cacheability of a workload from a first working-set size estimate generated from the workload over a first monitoring interval;
    determining if the first working-set size estimate should be stored by monitoring a value change in a working-set size over multiple monitoring intervals, determining from a previous iteration if a similar working-set size estimate was stored, or updating the first working-set size estimate based on a second working-set size estimate from a similar workload;
    determining, using a processor, a workload cache size based on the cacheability of the workload; and
    dynamically allocating a cache within the storage system in accordance with the workload cache size.

2. The method of claim 1, wherein estimating the cacheability of the workload comprises:
    determining if the first working-set size estimate approximates a first working-set size of the workload over the first monitoring interval;
    wherein the first monitoring interval is recorded and used in a subsequent cacheability estimation when the first working-set size estimate approximates the first working-set size of the workload.

3. The method of claim 2, further comprising:
    creating a second monitoring interval by increasing the first monitoring interval when the first working-set size estimate does not approximate the first working-set size of the workload; and
    updating the cacheability of the workload based on a second working-set size estimate generated from the workload over the second monitoring interval.

4. The method of claim 1, further comprising determining if a qualitative aspect of the workload has changed.

5. The method of claim 4, wherein determining if the qualitative aspect of the workload has changed comprises:
    creating a second monitoring interval by increasing the first monitoring interval;
    updating the cacheability of the workload based on a second working-set size estimate generated from the workload over the second monitoring interval; and
    determining if differences between the first working-set size estimate and the second working-set size estimate vary more than a predetermined amount.

6. The method of claim 1, wherein the first monitoring interval includes a number of IO accesses.

7. The method of claim 1, further comprising dynamically adjusting the first monitoring interval based on a size of a volume of the workload, a maximum size of the cache, and a rate of change of the first working-set size estimate as IO accesses increase.

8. The method of claim 1, further comprising determining if previously stored working-set size estimates should be removed from storage.

9. A storage system comprising:
    a processor;
    a cache memory coupled with the processor, wherein the cache memory is associated with a workload;
    a cacheability module to estimate cacheability of the workload from a working-set size estimate generated from the workload over a monitoring interval;
    an approximation module to receive the working-set size estimate and an actual working-set size over the monitoring interval and generate an indication of approximation by determining how well the working-set estimate tracks the actual working-set size over the monitoring interval;

a monitoring module to receive the indication of approximation and set the monitoring interval for use in a subsequent cacheability estimation when the indication of approximation identifies the working-set size estimate tracks the working-set size of the workload within a predetermined criteria, wherein the monitoring module increases the monitoring interval until either the working-set size estimate reaches a size of the cache memory or the indication of approximation identifies that the working-set size estimate tracks the working-set size of the workload within the predetermined criteria;

a sizing module to determine a workload cache size based on the cacheability of the workload; and an allocation module to dynamically allocate the cache memory in accordance with the workload cache size.

10. The storage system of claim 9, wherein the monitoring module monitors the workload for changes in one or more qualitative features of the workload and upon detection of changes in the one or more qualitative features of the workload the monitoring module adjusts the monitoring interval.

11. The storage system of claim 9, further comprising a storage module to determine whether the working-set size estimate should be stored.

12. The storage system of claim 9, further comprising a writable persistent storage media.

13. The storage system of claim 12, wherein the writeable persistent storage media includes a hard disk device (HDD).

14. A method comprising:
monitoring a workload of a file system over a first monitoring interval by tracing a working-set of the workload;
generating, using a processor, a working-set estimate based on the working-set of the workload during the first monitoring interval;
computing an approximation score by comparing the working-set estimate and the working-set over the initial monitoring interval;
determining, when the approximation score meets a predefined threshold, a workload cache size based on the first working-set estimate of the workload;
subsequently using the first monitoring interval for additional workload tracing when the approximation score meets the predefined threshold;
creating a second monitoring interval by increasing the first monitoring interval when the approximation score does not meet the predefined threshold;
updating the working-set estimate based on a second working-set generated from the workload over the second monitoring interval; and
dynamically allocating a cache within the file system in accordance with the workload cache size.

15. The method of claim 14, further comprising monitoring for a change in a qualitative aspect of the workload and adjusting the second monitoring interval in accordance with the change in the qualitative aspect.

16. The method of claim 14, wherein the first monitoring interval includes a number of IO accesses.

17. The method of claim 14, further comprising adjusting the first monitoring interval based on a size of a volume of the workload, a maximum size of the cache within the file system, and a rate of change of the working-set estimate as the number of IO accesses increases.

18. The method of claim 14, further comprising determining if the working-set estimate should be stored based on one or more of a change in the working-set, a second working-set estimate from a similar workload, or a determination to store a similar working-set estimate in a previous iteration.

19. The method of claim 18, further comprising determining if previously stored working-set estimates should be removed from storage.

20. A method for caching allocation performed on a storage system, the method comprising:
estimating cacheability of a workload from a first working-set size estimate generated from the workload over a first monitoring interval, wherein estimating the cacheability of the workload includes:
determining if the first working-set size estimate approximates a first working-set size of the workload over the first monitoring interval; and
wherein the first monitoring interval is recorded and used in a subsequent cacheability estimation when the first working-set size estimate approximates the first working-set size of the workload;
creating a second monitoring interval by increasing the first monitoring interval when the first working-set size estimate does not approximate the first working-set size of the workload;
updating the cacheability of the workload based on a second working-set size estimate generated from the workload over the second monitoring interval
determining, using a processor, a workload cache size based on the cacheability of the workload; and
dynamically allocating a cache within the storage system in accordance with the workload cache size.

21. The method of claim 20, further comprising determining if a qualitative aspect of the workload has changed.

22. The method of claim 21, wherein determining if the qualitative aspect of the workload has changed comprises:
creating a third monitoring interval by increasing the first monitoring interval;
updating the cacheability of the workload based on a third working-set size estimate generated from the workload over the third monitoring interval; and
determining if differences between the first working-set size estimate or the second working-set size estimate and the third working-set size estimate vary more than a predetermined amount.

23. The method of claim 20, wherein the first monitoring interval includes a number of IO accesses.

24. The method of claim 20, further comprising dynamically adjusting the first monitoring interval based on a size of a volume of the workload, a maximum size of the cache, and a rate of change of the first working-set size estimate as IO accesses increase.

25. The method of claim 20, further comprising determining if the first working-set size estimate should be stored.

26. The method of claim 25, further comprising determining if previously stored working-set size estimates should be removed from storage.

27. The method of claim 20, further comprising determining if the first working-set size estimate should be stored by monitoring a value change in the working-set size over multiple monitoring intervals, determining from a previous iteration if a similar working-set size estimate was stored, or updating the first working-set size estimate based on a second working-set size estimate from a similar workload.

28. A method for caching allocation performed on a storage system, the method comprising:
estimating cacheability of a workload from a first working-set size estimate generated from the workload over a first monitoring interval;

determining if a qualitative aspect of the workload has changed, wherein determining if the qualitative aspect of the workload has changed includes:

creating a second monitoring interval by increasing the first monitoring interval;

updating the cacheability of the workload based on a second working-set size estimate generated from the workload over the second monitoring interval; and determining if differences between the first working-set size estimate and the second working-set size estimate vary more than a predetermined amount;

determining, using a processor, a workload cache size based on the cacheability of the workload; and dynamically allocating a cache within the storage system in accordance with the workload cache size.

29. The method of claim 28, wherein estimating the cacheability of the workload comprises:

determining if the first working-set size estimate approximates a first working-set size of the workload over the first monitoring interval;

wherein the first monitoring interval is recorded and used in a subsequent cacheability estimation when the first working-set size estimate approximates the first working-set size of the workload.

30. The method of claim 29, further comprising:

creating a third monitoring interval by increasing the first monitoring interval when the first working-set size estimate does not approximate the first working-set size of the workload; and updating the cacheability of the workload based on a third working-set size estimate generated from the workload over the third monitoring interval.

31. The method of claim 28, wherein the first monitoring interval includes a number of IO accesses.

32. The method of claim 28, further comprising dynamically adjusting the first monitoring interval based on a size of a volume of the workload, a maximum size of the cache, and a rate of change of the first working-set size estimate as IO accesses increase.

33. The method of claim 28, further comprising determining if the first working-set size estimate should be stored.

34. The method of claim 33, further comprising determining if previously stored working-set size estimates should be removed from storage.

35. The method of claim 28, further comprising determining if the first working-set size estimate should be stored by monitoring a value change in the working-set size over multiple monitoring intervals, determining from a previous iteration if a similar working-set size estimate was stored, or updating the first working-set size estimate based on a second working-set size estimate from a similar workload.

* * * * *